Dec. 13, 1960 H. M. BISSELL ET AL 2,964,656
TRANSISTORIZED BIPOLAR AMPLIFIER
Filed June 11, 1958
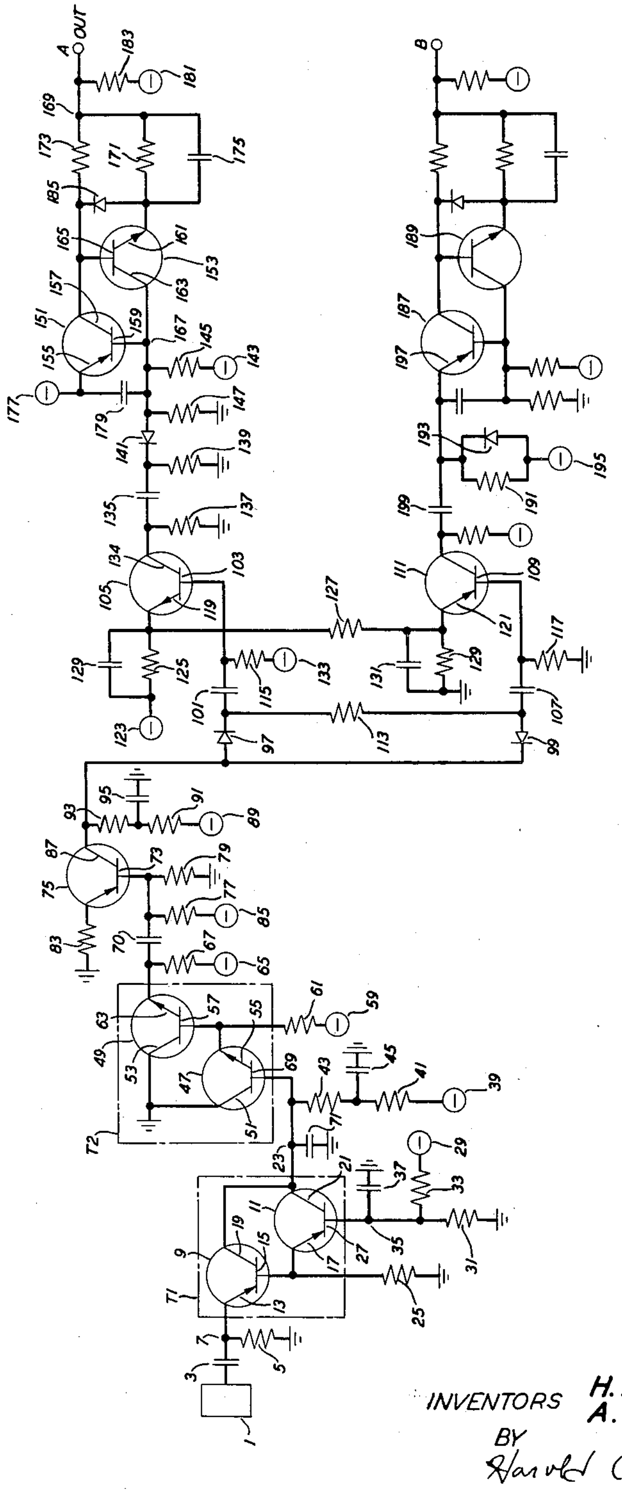
INVENTORS H. M. BISSELL
A. ZAROUNI
BY Harold C. Herman
ATTORNEY United States Patent Office 2,964,656

Patented Dec. 13, 1960

2,964,656

TRANSISTORIZED BIPOLAR AMPLIFIER

Henry M. Bissell, Whippany, N.J., and Alfred Zarouni, Brooklyn, N.Y., assignors to Bell Telephone Laboratories, Incorporated, New York, N.Y., a corporation of New York Filed June 11, 1958, Ser. No. 741,292

4 Claims. (Cl. 307—88.5)

This invention relates to signaling systems and more particularly to a bipolar amplifier to be used in such systems for providing a pair of output pulses corresponding to the positive and the negative excursions of signals from a single-ended alternating-current source of high frequency signals.

In modern signaling systems, information is very often recorded in a storage medium and processed periodically to perform repetitive operations. There are many available storage mediums wherein information may be recorded and stored for indefinite periods and which may be repeatedly processed without mutilation. Such storage mediums, for example, include magnetic drum arrangements, perforated tape, magnetic tape, etc. The sensing of information recorded in such mediums generally falls into one of two methods. The first of these methods may be termed a mechanical sensing whereby an electrical circuit is completed due to the presence or absence of the recorded information in the medium to produce a unipolar pulse. A second method may be termed a magnetic sensing whereby the relative movement of the stored information with respect to the magnetic sensing device is effective to produce a change of flux density in the sensing device. If the information is stored as discrete spots, a magnetic sensing thereof is productive of a bipolar pulse, each excursion of the signal corresponding to the leading and the trailing edge, respectively, of the incremental area of recorded information passing beneath the sensing device.

Bipolar pulses of the type derived by the magnetic sensing methods may be used to distinct advantage to drive a plurality of channels whose operation demands that the separate channels are not triggered simultaneously or that one channel lags in operation with respect to the other channel. While magnetic sensing systems are capable of developing pulses of very high repetition frequency, the limitation of such frequencies being the speed at which the transport mechanism is able to move the stored information beneath the sensing device, bipolar signals of such frequencies are not easily disseminated. Bipolar signals are generally separated according to polarity by means of a bipolar amplifier which includes a diode phase-splitting arrangement. Such arrangements normally include coupling capacitors connecting the output from each diode to an associated utilization device. A serious limitation as to the dissemination of very high frequency bipolar pulses is inherently present in such amplifiers as the coupling capacitors must be discharged during the time interval between the successive pulses which are directed through its respective diode.

In normal operation, the charging time constant is normally smaller than the discharging time constant of the coupling capacitors employed in the diode phase-splitting arrangement as the utilization device provides a low impedance path to the charging current. Where the impedance of the charging circuit is much greater than that of the discharge circuit, a residual voltage will not be accumulated by the coupling capacitor. However, if the impedance of the charging circuit is approximately equal to or less than the impedance of the discharging circuit and the pulses to be disseminated are of relatively high repetition frequency, a residual charge will develop on the capacitor. The residual charge allows only those pulses having a voltage magnitude greater than the residual voltage charge on the capacitor to traverse the capacitor and then only for magnitude equal to the difference between the pulse magnitude and the capacitor charge. Under such conditions, a point will be reached wherein the capacitor will gain and lose equal amounts of charge for a given series of pulses. The greater the repetition rate of the signal, the more closely will the voltage across the capacitor approach a direct-current level.

Attempts are evidenced in the prior art of bipolar amplifier circuits wherein the coupling capacitors of the diode-phase splitting arrangement may be discharged more rapidly during the interpulse interval. Such attempts have included the provision of a voltage source associated with each capacitor to maintain the charge receiving plate thereof at a fixed potential so that a discharge potential level is established. Such discharge level is effective to increase the increment of voltage discharge per unit interval of time. These arrangements, of necessity, require a greater number of components, referring specifically to the added voltage sources. In addition, an added disadvantage of such arrangements is the reverse biasing effect of the added voltage source upon the diodes which affects a clamping of the signal so that only part of the signal is available. The operation of such arrangement presents a situation wherein the portion of the wanted signal lost through the diode is related to the increase in the voltage increment of discharge per unit time for the capacitor since each are related to the magnitude of the biasing potential supplied by the added voltage source. In other words, an increase in the magnitude of the reference discharge level offered to the capacitor necessarily increases the reverse biasing potential on the diode by an equal amount.

An object of this invention is to provide a more efficient and economical bipolar amplifier capable of disseminating bipolar signals having high repetition frequencies according to polarity.

Another object of this invention is to provide a bipolar amplifier wherein each excursion of the bipolar signal may be directed according to polarity to a plurality of channels with a minimum of loss.

A further object of this invention is to provide a bipolar amplifier having a phase-splitting arrangement which is rapidly normalized.

In one illustrative embodiment of the invention, a bipolar amplifier is provided which transforms a bipolar signal from a single-ended source to two serially arranged trains of pulses corresponding to the positive and negative excursions of the signal, respectively. The amplifier includes a diode and transistor arrangement which is operative to separate the excursions of the bipolar signal according to polarity and direct the separated excursions to independent channels. The channels are interconnected by an impedance element which connects the junctions of a diode and a coupling capacitor in each channel. The appearance of a pulse in either of the channels appears to the charged coupling capacitor in the other channel as a voltage source. This apparent voltage source is effective to establish a temporary discharge potential level for the charged coupling capacitor only during its discharge cycle to increase the increment of discharge per unit time. A discharge path is accordingly provided to a charged coupling capacitor in either of the channels through the impedance element and the diode in the other channel in by-pass of the high back resistance of its associated diode.

A feature of this invention relates to the provision of a direct-current path which connects the junctions of the diode and coupling capacitors in a diode phase-splitting arrangement.

A further feature of this invention pertains to the provision of a discharge potential level of such polarity as to increase the increment of voltage discharge per unit time of a charged capacitor device only during portions of the discharge cycle.

A still further feature of this invention relates to the provision of a discharge path for the coupling capacitor in each channel of a diode phase-splitting circuit which includes the diode in the other channel.

Another feature of this invention relates to the provision of transistor devices for each of the diodes of a phase-splitting arrangement, the transistor devices being of opposite conductivity types, to insure a unipolar pulse for each of the independent channels. The transistor devices aid the diodes to separate the excursions of the bipolar signal and to prevent overshoot due to the storage effects of the capacitors.

Still another feature relates to the provision of a pulse clamping arrangement associated with each diode of a diode phase-splitting arrangement.

Further objects and features will become apparent upon reference to the following description in connection with the accompanying single figure which is a circuit diagram of one specific illustrative embodiment of the present invention.

In the single figure, an arrangement is shown capable of providing a series of triggering pulses of high repetition frequency to separate output terminals A and B which correspond, respectively, to the negative and positive excursions of a bipolar signal developed by source 1. Source 1 may be any arrangement which operates to develop alternating-current signals. The bipolar signals from source 1 are directed through the coupling capacitor 3 and applied across resistor 5 to the input terminal 7 of a three-terminal equivalent transistor amplifying device T1. The transistor device T1 is of the type disclosed in S. Darlington patent, No. 2,663,806, issued on December 22, 1953. In the transistor device T1, two p-n-p junction transistors 9 and 11 are co-related to produce a transistor device having an alpha which is less than one but greater than the alpha of each of the component transistors 9 and 11. Input terminal 7 of the transistor device T1 is connected to the emitter electrode 13 of transistor 9. The base electrode 15 of transistor 9 is electrically integral with the emitter electrode 17 of the transistor 11, and the collector electrodes 19 and 21 of transistors 9 and 11, respectively, are connected at point 23. The interconnection of the base electrode 15 and the emitter electrode 17 results in the emitter current of transistor 11 being a portion of the base current of transistor 9. Resistor 25 is connected from the junction of base electrode 15 and the emitter electrode 17 to ground so as to be in parallel arrangement with the emitter-base circuit of transistor 11. The emitter current of transistor 11 is thereby determined by the respective values of resistor 25 with respect to the instantaneous value of the impedance presented by the emitter-base junction of transistor 11 and the external base circuit which are in parallel therewith. An operating potential is supplied to the base electrode 27 of transistor 11 from the voltage source 29 through the agency of a voltage divider consisting of resistors 31 and 33. The junction of resistors 31 and 33 is connected to point 35 which is, in turn, connected to the base electrode 27. A decoupling capacitor 37 connects the junction of resistors 31 and 33 to ground. An operating potential is supplied from the source 39 through the serially arranged resistors 41 and 43 to point 23 which is connected to the junction of the collector electrodes 19 and 21. The junction of resistors 41 and 43 is connected to ground through the capacitor 45. The arrangement so far described is of a three-terminal transistor device: the emitter electrode 13 of transistor 9, which is connected to point 7, corresponds to an equivalent emitter electrode; the base electrode 27 of transistor 11, which is connected to point 35, corresponds to an equivalent base electrode; and the junction of the collector electrodes 19 and 21 at point 23 corresponds to an equivalent collector electrode.

The transistor device T1, which is connected in a common base configuration, affects an inversion of the signal. The application of either a positive or a negative excursion of the bipolar pulse developed by source 1 to point 7 biases the emitter electrode 13 with respect to the base electrode 15. The flow of base current in transistor 9 develops a biasing voltage across the parallel arrangement of the emitter-base circuit of transistor 11 and resistor 25. Resistor 25 is effective to prevent excessive leakage current of transistor 9 from driving transistor 11 to cut-off when the transistor device T1 is in a low conductive state. The emitter-base junction of transistor 11 offers an impedance which varies inversely with the current flow therethrough. When a minimum current is directed to the emitter electrode 17 from the base electrode 15, the impedance of the emitter-base circuit of transistor 11 is at a maximum. Under such conditions excessive leakage currents due to transistor 9 would be effective to sink the emitter current of transistor 11 and drive the transistor 11 to cut-off. Accordingly, most of the leakage current of transistor 9 is directed through resistor 25 which presents a low impedance relative to that offered by the emitter-base junction and the external base circuit of transistor 11. The low impedance path offered to the leakage current of transistor 9 from ground through resistor 25 in by-pass of transistor 11 and the collector-base circuit of transistor 9 insures reliability of operation for the transistor device T1. As the collector currents in each of the transistors 9 and 11 flow from their respective collector electrodes, these currents are additive. The total load current through the resistor 43 is the combined collector currents from transistors 9 and 11. The effective alpha of the equivalent transistor device T1 is given as $\alpha_1+\alpha_2(1-\alpha_1)$, where $\alpha_1$ and $\alpha_2$ are the current amplification factors of transistors 9 and 11, respectively.

The effective alpha of the transistor device T1 is less than unity so a current gain is not realized. The resistor 43, however, is of sufficient value to affect a large voltage gain. The amplified bipolar pulse developed across the resistor 43 is directed to a transistor device T2 which isolates a common emitter amplifier including the transistor 75, hereinafter to be described, from the amplifier including the transistor device T1. The transistor device T2 includes the n-p-n junction transistors 47 and 49 which are co-related so as to produce a three-terminal equivalent transistor device which is connected in a common collector or emitter follower configuration. The collector electrodes 51 and 53 of the transistors 47 and 49, respectively, are connected to ground. The emitter electrode 55 of transistor 47 is connected to the base electrode 57 of transistor 49. A negative voltage is applied to both the base electrode 57 and emitter electrode 55 from a negative source 59 through the resistor 61. A negative potential is supplied to the emitter electrode 63 of transistor 49 from the voltage source 65 through the resistor 67. The output signal developed by the transistor device T1 is supplied to the base electrode 69 of transistor 47 from point 23. A maximum transfer of signal is had by arranging the common collector configuration of transistor device T2 in tandem with the common base configuration of transistor device T1 as the high input impedance of the former provides a proper matching for the high output impedance of the latter. Shunting capacitor 71 is provided at the output of the device T1 to limit the bandwidth of the signal applied to the base electrode 69 of transistor 47. The capacitor 71 should be of such value as not to effect the desired signal while providing a low impedance path to ground for any noise which may be developed. The transistor device T2 results in an alpha which approaches unity and allows for the substitution of nonselected transistors without appreciably affecting the operation of the device.

The operation of transistor device T2 develops a bipolar signal across resistor 67. The signal is directed through the coupling capacitor 70 to the base electrode 73 of the p-n-p junction transistor 75. The transistor 75 is arranged in a common emitter configuration in which the emitter electrode 81 is connected to ground through resistor 83. A voltage source 85 is connected to ground through a voltage divider comprising resistors 77 and 79, the junction of which is connected to the base electrode 73. An operating potential is provided to the collector electrode 87 of transistor 75 from the voltage source 89 through the serially arranged resistors 91 and 93. A decoupling capacitor 95 is connected between the junction point of resistors 91 and 93 to ground.

The above-discussed amplifying stages which include the transistor devices T1 and T2 and transistor 75 operate to amplify the bipolar pulse developed by source 1. The output signal from transistor 75 provides a bipolar signal which corresponds to the positive and negative excursions of the pulse from source 1. This output signal is applied simultaneously to the anode of diode 97 and to the cathode of diode 99 of a phase-splitting network. The cathode of diode 97 is connected by the coupling capacitor 101 to the base electrode 103 of an n-p-n junction transistor 105. The anode of diode 99 is connected by the coupling capacitor 107 to the base electrode 109 of a p-n-p junction transistor 111. The junction of the cathode of diode 97 and the capacitor 101 is connected to the junction of the anode of diode 99 and the capacitor 107 by resistor 113. The diodes 97 and 99 are oppositely poled with respect to the collector electrode 87 of transistor 75 so that each conducts alternate excursions of the bipolar signal. The diode 97 conducts the positive excursion of the bipolar signals through the coupling capacitor 101 and across the resistor 115 to the base electrode 103 of the n-p-n junction transistor 105. Similarly, diode 99 conducts the negative excursions of the signal through the coupling capacitor 107 and across the resistor 117 to the base electrode 109 of p-n-p junction transistor 111. Biasing potentials are applied to the emitter electrodes 119 and 121 of transistors 105 and 111, respectively, by the common voltage source 123 through the agency of a voltage divider comprising resistances 125, 127 and 129. Resistors 125 and 127 are bypassed by capacitors 129 and 131, respectively, so that the emitter biasing potentials are unaffected by the operation of either transistor. Transistors 105 and 111 are normally reverse biased and adapted to be individually driven to saturation by the application of a pulse of proper polarity to their respective base electrodes. The reverse biased conditions of transistors 105 and 111 are maintained by the application of a negative potential from the source 123 to their respective emitter electrodes. A negative potential is supplied to the base electrode 103 of transistor 105 from source 133 which is of a greater magnitude than that supplied to the emitter electrode 119 from source 123 to maintain transistor 105 at cut-off. The application of a positive pulse through capacitor 101 reduces the magnitude of the negative potential supplied to the base electrode 103 sufficiently to forward bias transistor 105 and drive it to saturation. The operation of transistor 111 is similar to that of transistor 105 except that the polarity of the operating potentials applied to the electrodes 121 and 109 are reversed. The negative potential supplied to the emitter electrode 121 is effective to maintain transistor 111 in a reverse biased condition as the base electrode is maintained at ground potential due to its connection through resistor 117 to ground. The application of a negative pulse through capacitor 107 is effective to cause the base electrode 109 to become negative with respect to the emitter electrode 121 and drive transistor 111 to saturation.

The transistor 75 is arranged to be operated either at saturation or at cut-off and is maintained quiescent at a point intermediate these extremes. A positive excursion of the bipolar pulse from the device T1 is sufficient to drive the transistor 75 to cut-off while a negative excursion is sufficient to drive the transistor 75 to saturation. When transistor 75 is saturated, the voltage at the collector electrode 87 becomes less negative to direct a positive-going pulse to the diode arrangement including diodes 97 and 99. This positive-going pulse, being applied simultaneously to the anode of diode 97 and the cathode of diode 99, is effective to reverse bias the diode 99 and forward bias the diode 97 to provide a pulse to coupling capacitor 101. As the voltage across the capacitor 101 cannot change instantaneously, the capacitor 101 operates as an effective short circuit and the pulse appears across the resistor 115 to forward bias the transistor 105. Similarly, a positive excursion of the bipolar signal from the device T2 to the base electrode 73 produces a negative-going pulse across resistor 93 which reverse biases the diode 97 and forward biases the diode 99 to direct a pulse to the base electrode 109 through the capacitor 107.

Considering capacitor 101 during the application of a bipolar signal to the diodes 97 and 99, the positive excursion of the signal through diode 97 causes the capacitor to acquire a finite charge. The magnitude of this charge is a function of the value of the capacitor 101, the duration of the applied pulse and the impedance in the charging path. The charging path for the capacitor 101 is primarily through the series arrangement of the resistor 83 and the internal emitter-collector impedance of the transistor 75 in parallel with the serially connected resistors 91 and 93. The parallel arrangement is connected to the coupling capacitor 101 through the forward impedance of diode 97. On the other side of the capacitor 101, the charging path is through the resistor 115 in parallel with the series arrangement of resistor 125 and the internal emitter-base impedance of the transistor 105. The discharge path for the capacitor 101, without the employment of the resistor 113, includes the same path except that the diode 97 and the emitter-base circuit of transistor 105 each presents a high impedance to the discharge current. The discharge time for returning the capacitor 101 to normal is therefore much greater than its charging time. The application of pulses of high repetition frequency would therefore cause capacitor 101 to develop a residual charge.

With the resistor 113 included in the diode arrangement, diodes 97 and 99 are now arranged in parallel and are both included in the charging and the discharging path of each of the coupling capacitors 101 and 107. It is apparent that the impedance of the parallel arrangement of diodes 97 and 99 is determined by that diode which is conductive since the impedance presented by the conductive diode to the signal is many times smaller than that presented by the diode which remains reverse biased.

After the positive excursion of the signal, the negative excursion of the signal is directed to the diode arrangement. Diode 97 becomes reverse biased and the capacitor 101 enters into the discharge cycle of its operation looking into the reverse biased impedance of diode 97. The negative excursion causes the diode 99 to become forward biased to determine the impedance of the parallel circuit including diodes 97 and 99. Accordingly, the discharge path of capacitor 101 is provided with a low impedance discharge path consisting of the resistor 113 and the now forward biased diode 99 to by-pass the high impedance offered to the discharge current by the reverse biased diode 97. Diode 99 effectively acts as a variable impedance as it presents a low impedance to current flow only during the discharging of capacitor 101. This low impedance path in by-pass of diode 97 is only provided during the negative excursion of the bipolar signal or that time during which the capacitor 101 is not being charged. It is evident that if a time separation exists between the positive and the negative excursions of the bipolar pulse, resistor 113 is also effective to more rapidly discharge either of the coupling capacitors 101 or 107 as the accumulated charge on each is of such magnitude and polarity to forward bias diodes 99 and 97, respectively. The voltage at the collector electrode 87 functions as a discharge reference level for each of the coupling capacitors 101 and 107.

The discharge of a capacitor per unit time is a function of both the impedance of the discharge path and the potential level to which the capacitor must discharge. In the situation where capacitor 101 is charged and the negative excursion of the bipolar pulse is applied to the cathode of diode 99, a low impedance path is provided from the capacitor 101 through the diode 99 to the collector electrode 87 of transistor 75 so that a temporary discharge potential level is created to which the capacitor discharges. This discharge level follows the potential level at collector electrode 87. Each negative excursion of the voltage on collector electrode 87 will, therefore, be effective to direct a pulse to the coupling capacitor 107 and to simultaneously provide a discharge level for the coupling capacitor 101 arranged in the other channel. Since the temporary discharge level is of opposite polarity to that of the charge on capacitor 101, a greater discharge per unit time is achieved so that the capacitor 101 returns to a steady-state condition more rapidly. A steady-state condition for the coupling capacitor 101 is arrived at when the voltage at the junction of the capacitor and its associated diode is equal to the voltage of collector electrode 87.

A similar operation may be traced for coupling capacitor 107 which is charged by a negative excursion of the bipolar pulse through diode 99 and discharged to a temporary discharge level established by the positive excursion of the bipolar pulse through the diode 97. It is apparent, therefore, that the temporary potential for each coupling capacitor is created during the time interval between successive pulses to the individual coupling capacitors. The diodes 97 and 99 operate as a bilateral switch arrangement operative to make the potential at collector 87 at all times effective upon each of the capacitors 101 and 107. The rapid discharge of each capacitor during this time interval prevents the accumulation of a residual charge upon the capacitors to allow for the separation of higher frequency pulses by the diode arrangement.

As described above, the separated pulses through the diodes 97 and 99 are supplied respectively to the transistors 105 and 111. The pulses developed by transistors 105 and 111 are each directed to regenerative pulse amplifying circuits, the outputs of which are individually connected to one of the output terminals A and B. The collector electrode 134 of transistor 105 is connected to the junction of the coupling capacitor 135 and resistor 137 which is connected to ground. The pulse developed by transistor 105 across resistor 137 is applied through the coupling capacitor 135 across the resistor 139 to a clamping circuit which includes the diode 141. A negative potential is applied to the anode of diode 141 from the voltage source 143 through the resistor 145 and across the resistor 147. This potential from source 143 is effective to maintain the diode 141 in a reverse biased state while the magnitude of the negative pulse from the transistor 105 is less than the magnitude of the voltage drop across the resistor 147. The negative-going pulse which is applied to the cathode of diode 141 is, therefore, effectively clamped to the negative voltage level established by source 143 across resistor 147. The pulse which is directed through diode 141 is applied to a regenerative pulse amplifier which includes the transistors 151 and 153.

The regenerative pulse amplifier herein shown includes an effective three-terminal device comprising the pair of junction transistors 151 and 153 of opposite conductivity types. Transistor 151 is a p-n-p type transistor having an emitter electrode 155, a collector electrode 157 and a base electrode 159. The transistor 153 is an n-p-n type transistor having an emitter electrode 161, a collector electrode 163 and a base electrode 165. The base electrode 159 is electrically integral with the collector electrode 163 at point 167 and the collector electrode 157 is electrically integral with the base electrode 165. The emitter electrode 161 and the base electrode 165 are each connected to point 169 through resistors 171 and 173, respectively. A capacitor 175 is placed in a shunt relationship with the resistor 171 so as to be arranged in the emitter current path of transistor 153. An analogy can be made to a conventional transistor device in that the emitter electrode 155 of transistor 151 may be considered an equivalent emitter electrode, point 169 may be considered an equivalent collector electrode and point 167 may be considered the equivalent base electrode. The voltage source 143 which is effective to provide biasing potentials to the diode 141 is also effective to provide operating potentials to the equivalent base electrode at point 167. A negative voltage source 177 is directly connected to the emitter electrode 155 and maintains the regenerative amplifier in an unoperative state as the bias potential applied by the voltage source 177 is more negative than that at the base electrode 159. A capacitor 179 is directly connected between the emitter electrode 155 and the base electrode 159 so as to make the amplifier less sensitive to transient pulses while not affecting its sensitivity to a normal signal pulse. A negative voltage source 181 is connected to the equivalent collector electrode at point 169 through the resistor 183 to complete the operating potentials for the regenerative amplifier. The regenerative amplifier is of the type disclosed by B. W. Lee in the copending patent application Serial No. 654,603, filed April 23, 1957, and in the copending patent application Serial No. 741,294 filed by H. Moraff on even date herewith.

While junction transistors inherently have an alpha which is less than unity, the composite transistor device has an effective alpha greater than unity and is readily adaptable for use in a regenerative pulse amplifier. The effective alpha of the composite arrangement is controlled by the ratio of the resistance values of resistors 171 and 173. For monostable operation, it has been found that the effective alpha should be between 1.6 and 4 and that the total leakage current should not exceed one milliampere to provide for a low current stable condition from which the arrangement can be readily triggered to a saturated condition.

A pulse developed by transistor 105 and directed through the clamping circuit which includes the diode 141 is effective to forward bias the emitter-base junction of transistor 151. Such condition will cause current flow from the collector electrode 157. The collector current of transistor 151 is directed to a two-branch parallel arrangement, one branch consisting of resistor 173 and the other branch consisting of the emitter-base junction of transistor 153 in series with the parallel arrangement of transistor 171 and capacitor 175. The control of the alpha by resistor 173 becomes obvious as that portion of the collector current of transistor 151 which is directed through the resistor 173 is not amplified by the transistor 153. Moreover, part of the collector current of transistor 153 is also shunted through the resistor 173 instead of being amplified to the emitter electrode 161 of transistor 153. A part of the collector current of both transistors 151 and 153 is thereby shunted and not amplified through the resistor 173 to effectively control the current through the emitter 161. The amount of shunted current depends on the ratio of resistor 171 to resistor 173. It has been found that a resistance value for resistor 171 should be about ten times that of resistor 173 for proper operation of the present circuit. The signal current appearing at point 169 is the sum of the current shunted by resistor 173 and the emitter current of transistor 153 through the parallel arrangement of resistor 171 and capacitor 175. The capacitor 175 is normally discharged so that the initial impedance of the emitter circuit of transistor 153 is relatively low and the alpha of the composite arrangement is relatively high.

Upon conduction in transistor 153, the capacitor 175 is charged by the emitter current to increase the effective impedance of the emitter circuit and to decrease the effective alpha of the composite arrangement with time. Regeneration for the composite arrangement is provided by the parallel resistors 145 and 147 which are each connected to the equivalent base at point 167. The direction of base current flow of transistor 151 and the collector current flow of transistor 153 are in the same direction and provide a negative resistance characteristic for the composite arrangement. This negative resistance characteristic is provided since the total current through the parallel resistors 145 and 147 further forward biases the emitter electrode 155 with respect to the base electrode 159. Accordingly, the arrangement is self-maintained in a high conductive state during that time in which the effective composite alpha is greater than one. The time during which the composite alpha is greater than one is determined by that time which is required for the capacitor 175 to charge sufficiently to reverse bias the transistor 153. At this time, there is no collector current flow of transistor 153 through the parallel arrangement of resistors 145 and 147 and the regeneration in the composite arrangement will cease. Upon the transistor 153 becoming reverse biased, the charge on the capacitor 175 and the subsequent increase in potential of base electrode 165 operates to forward bias diode 185 which is connected between the emitter electrode 161 and base electrode 165. Diode 185 is poled so as to offer a low impedance discharge path for the capacitor 175. The path also includes the resistor 173, mentioned above as being one-tenth as large as resistor 171. The operation of the regenerative amplifier is effective to produce a pulse at point 169 which is connected to the output A.

The arrangement shown of the regenerative amplifier in the opposite channel which comprises the transistors 187 and 189 is similar to the arrangement as was described with respect to transistors 151 and 153. The clamping circuit associated with this regenerative amplifier, however, is adapted to clamp a positive pulse instead of a negative pulse. The clamping arrangement consists of the parallel arrangement including resistor 191 and diode 193 which connects the negative voltage source 195 to the input of the regenerative pulse amplifier. As the pulse which is developed by the transistor 111 and directed through the coupling capacitor 199 to the regenerative pulse amplifier is positive, it is applied to the emitter electrode 197 to effectively forward bias the emitter-base junction of transistor 187. The operation of this regenerative pulse amplifier is similar to that which was described with respect to transistors 151 and 153. Upon operation of the transistors 187 and 189, a positive going pulse is applied to the output terminal B. The positive pulse appearing at output A is subsequent in time with respect to that pulse which appears at output B. The pulse appearing at output A corresponds to the negative excursions of the bipolar pulse developed by source 1 while the pulse at output B. corresponds to the positive excursion.

It should be understood that the foregoing disclosure relates to only one specific embodiment of the invention and that it is intended to cover all changes and modifications of the example of the invention herein chosen for the purpose of the disclosure, which do not constitute departures from the spirit and scope of the invention set forth in the appended claims.

What is claimed is:

1. In combination, a source of bipolar signals, a first and a second circuit means each responsive to signals of opposite polarities, parallel means directing signals of one polarity to said first circuit means and signals of the opposite polarity to said second circuit means, said parallel means including a first unilateral conducting device and a first capacitor device serially connected between said source and said first circuit means and a second unilateral conducting device and a second capacitor device serially connected between said source and said second circuit means, said first and second unilateral devices being oppositely poled with respect to said source, and means for discharging each of said capacitor devices through said unilateral device serially connected to the other of said capacitor devices, said discharging means comprising a single resistor connected directly between the common connection of said first unilateral device and said first capacitor device and the common connection of said second unilateral device and said second capacitor device.

2. In combination, a source of bipolar pulses, a capacitive device, a current path connecting said source and said capacitive device and including a unilateral conducting device poled to conduct pulses of a single polarity, said capacitive device being serially arranged with said unilateral device in said path as to be charged by said pulses of said single polarity, and means in parallel connection with said unilateral conducting device and connected to said capacitive device for discharging said capacitive device including a second unilateral conducting device connected to said source for applying pulses of the other polarity to said capacitive device during the interval between said pulses of said single polarity.

3. In combination, a source of bipolar signals, an output circuit including a capacitive device, a unilateral conducting device connecting said source of signals to said output circuit and offering a low impedance to said signals of one polarity, and means responsive to said signals of the other polarity for establishing a reference discharge level to said capacitive device proportional to the magnitude of said signals of the other polarity during the interpulse interval of successive signals of said one polarity comprising a second unilateral conducting device in parallel with said first unilateral conducting device and connected to said source for applying signals of the other polarity to said capacitive device during said interpulse interval.

4. In a bipolar amplifier, the combination comprising a first and a second diode in parallel connection each having an anode and cathode, a source of alternating-current signals, means for applying said signals to the said anode of said first diode and to the said cathode of said second diode, a first series circuit connected to said cathode of said first diode comprising a first coupling capacitor and a first circuit means, a second series circuit connected to said anode of said second diode comprising a second coupling capacitor and a second circuit means, and means comprising a single element for discharging said first coupling capacitor through said second diode and for discharging said second coupling capacitor through said first diode.

References Cited in the file of this patent

UNITED STATES PATENTS

| | | |
|---|---|---|
| 2,490,045 | Gardner et al. | Dec. 6, 1949 |
| 2,670,445 | Felker | Feb. 23, 1954 |
| 2,675,538 | Malthaner et al. | Apr. 13, 1954 |
| 2,702,854 | Woods | Feb. 22, 1955 |
| 2,760,087 | Felker | Aug. 21, 1956 |
| 2,782,267 | Beck | Feb. 19, 1957 |
| 2,791,644 | Sziklai | May 7, 1957 |
| 2,794,123 | Younker | May 28, 1957 |
| 2,864,961 | Lohman | Dec. 16, 1958 |

OTHER REFERENCES

Radio and Television News, vol. 56, July 1956, page 44, Fig. 2.